(12) United States Patent
Petrinovic

(10) Patent No.: US 6,927,692 B1
(45) Date of Patent: Aug. 9, 2005

(54) RF INVENTORY SYSTEM

(75) Inventor: Peter Petrinovic, Solon, OH (US)

(73) Assignee: American Greetings Corporation, Cleveland, OH (US)

( * ) Notice: Subject to any disclaimer, the term of this patent is extended or adjusted under 35 U.S.C. 154(b) by 195 days.

(21) Appl. No.: 10/235,619

(22) Filed: Sep. 5, 2002

(51) Int. Cl.[7] .......................... G08B 13/14; G08B 5/22
(52) U.S. Cl. ...................... 340/572.1; 340/568.1; 340/825.35; 340/825.49; 340/825.54
(58) Field of Search .................... 340/572.1, 10.3, 340/825.5, 568.1, 825.35, 825.49, 825.54

(56) References Cited

U.S. PATENT DOCUMENTS

| | | |
|---|---|---|
| 4,063,229 A | 12/1977 | Welsh et al. |
| 4,471,344 A | 9/1984 | Williams |
| 4,636,950 A * | 1/1987 | Caswell et al. ............... 705/28 |
| 4,673,932 A | 6/1987 | Ekchian et al. |
| 4,700,179 A | 10/1987 | Fancher |
| 4,862,160 A | 8/1989 | Ekchian et al. |
| 5,407,050 A | 4/1995 | Takemoto et al. |
| 5,519,381 A | 5/1996 | Marsh et al. |
| 5,640,151 A | 6/1997 | Reis et al. |
| 5,648,765 A | 7/1997 | Cresap et al. |
| 5,798,693 A | 8/1998 | Engellenner |
| 5,936,527 A * | 8/1999 | Isaacman et al. ......... 340/572.1 |
| 5,977,875 A | 11/1999 | Lin et al. |
| 6,002,344 A | 12/1999 | Bandy et al. |
| 6,025,780 A | 2/2000 | Bowers et al. |
| 6,058,374 A | 5/2000 | Guthrie et al. |
| 6,128,549 A | 10/2000 | Swartz et al. |
| 6,195,006 B1 | 2/2001 | Bowers et al. |
| 6,714,121 B1 * | 3/2004 | Moore ....................... 340/10.3 |

* cited by examiner

*Primary Examiner*—Jeffery Hofsass
*Assistant Examiner*—Lam Pham
(74) *Attorney, Agent, or Firm*—Roetzel & Andress

(57) ABSTRACT

A system and method for calculating a quantity of items wherein each item has a tag attached to it. A low intensity RF signal is radiated, causing each tag to generate a reflected signal. The frequency response of the reflected signals is then measured, and the quantity of tagged items is calculated based on the frequency response of the reflected signals.

13 Claims, 2 Drawing Sheets

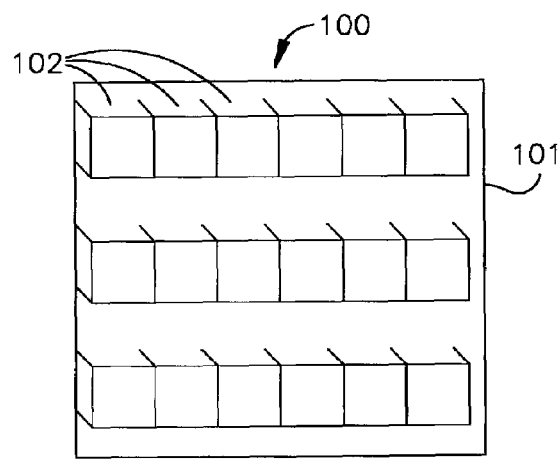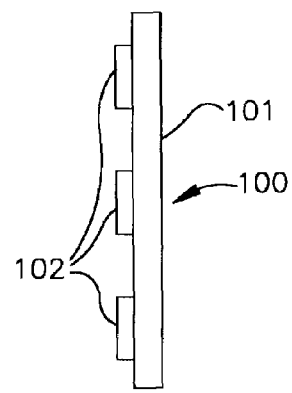
Fig.1A  Fig.1B
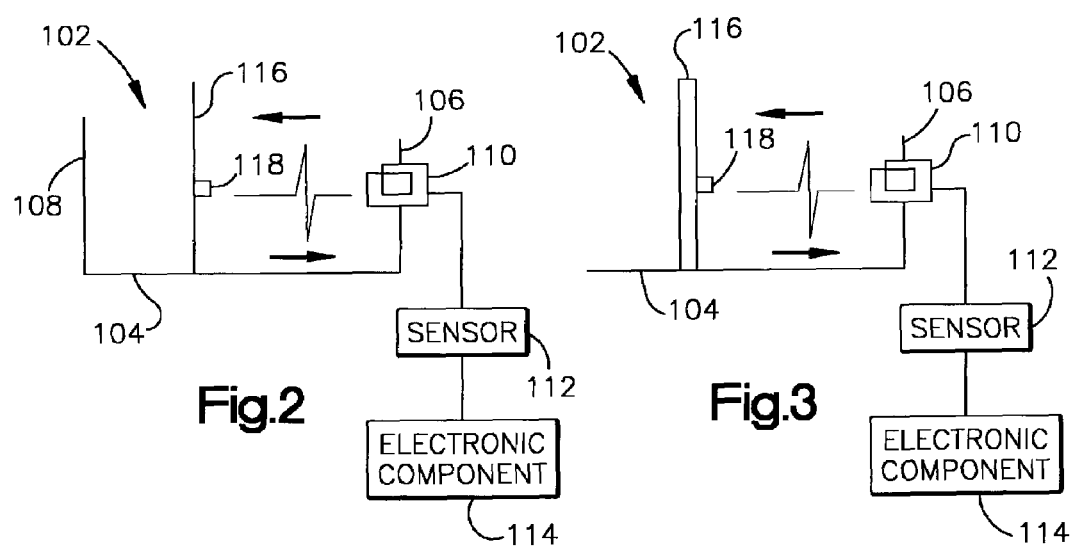
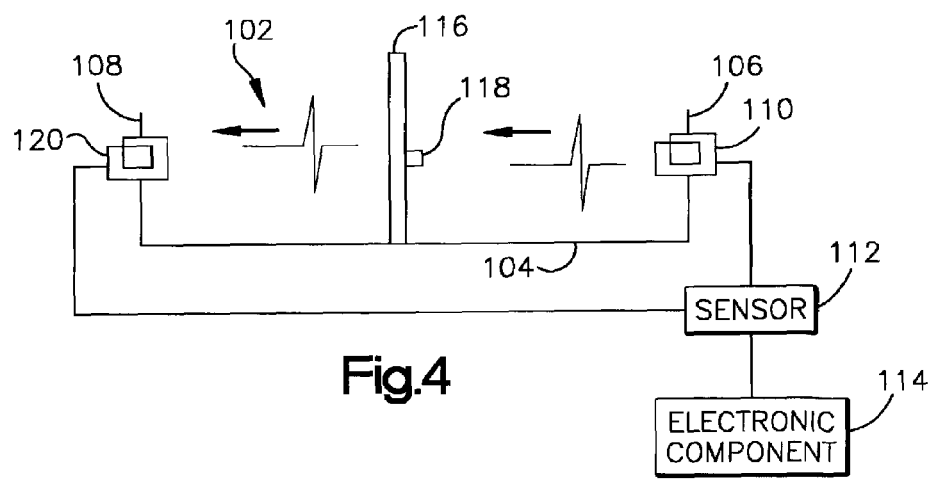

RF INVENTORY SYSTEM

CROSS-REFERENCE TO RELATED APPLICATIONS

Not applicable

BACKGROUND OF THE INVENTION

The present invention pertains generally to inventory control and, more particularly, to a method and system for determining item quantity inventory of a defined container using an RF (radio frequency) signal.

The availability of inventory technology coupled with the sales downturn and increased operating costs of recent recessionary periods have combined to force retailers to meet competitors' aggressive pricing by using more stringent inventory control techniques. The hidden costs associated with excess inventory or overstocking in the competitive retail industry are critically important. Large retailers estimate that the true cost of carrying inventory is on the order of 40% of the cost of the item per year. Moreover, the more inventory, the more manpower is required for inventory control. Most importantly to the retail food and drug trade, however, overstocking results in inflexible pricing. In many stores, electronic cash registers at the checkout counters have been replaced by computerized point of sale terminals. Optical scanners and bar codes on products, while posing other problems, allow flexible pricing and computerized real time inventory control and automated stock ordering. All in all, the various types of material requirement planning systems available today throughout the retail, wholesale and manufacturing sectors have become a indispensable tool of cost control.

Establishing precise control over retail inventory, however, requires more than reading bar codes at the checkout counter. In order to be purchased, products have to not only be ordered but delivered, uncrated, unboxed, marked and moved from the stock room onto the shelves or peg racks in the retail store. Even overstocked items will fail to reach the checkout counter unless they are on the shelf. Furthermore, because of pilferage, the actual inventory may vary from the inventory calculated by checkout counter systems.

Taking inventory for reordering or restocking of shelves is time consuming but essential, particularly where individual stores stock thousands of shelf items. Shelf stocktaking should be fast and inexpensive to encourage daily adjustments. However, today shelf inventory taken by visual inspection often requires manipulation of individual products on a display rack. For example, in order to reorder greeting cards, typically an employee needs to look at each and every pocket in a card cabinet, determine if the number of cards is at or below the reorder point, retrieve the reorder ticket from the back of the pocket and scan it to record a reorder. This is a very labor intensive, expensive, and error prone process which, if automated, could allow for unattended monitoring of overall inventory by detecting and summing the product quantities of all pockets in a cabinet.

The automated inventory counters of the prior art typically utilize unique tags corresponding to each specific item. However, this requires a user to manage each unique tag and to maintain some type of local data base which stores the meaning of each tag's unique identifier in order to properly interpret the reading. These prior art counters are designed only to determine quantity of a plurality of different products.

Other inventory counters of the prior art, use features such as weight or opacity to determine quantity. However, these prior art counters are unsuitable for products which have varying weights, dimension, or other characteristics.

Thus, there is a need for an automated inventory counter which determines quantity of products, as well as allows for unattended monitoring of overall inventory by detecting when, how often, and from which display products are picked up and replaced by consumers who are browsing a department.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a method and system for determining inventory based on the frequency response to a signal. There are three basic components to the system, a tag, and a sensor with a computational chip.

The tag may be an inexpensive, one bit tag. All of the tags for all products may be identical and may be comprised of either a conducting loop of material, typically a true metallic hot stamp, or can be printed as a consistent pattern of magnetic ink on each product.

The sensor has at least one antenna attached to it. Preferably, the sensor is part of a cabinet which holds the items to be inventoried. The sensor sends out a low intensity radio frequency (RF) signal and receives back the modulated reflection any tag it encounters via the antenna, or alternatively detects the magnetic fields created by the nearby magnetic tags. The sensor has circuits to detect the frequency of the RF energy received and has an algorithm built into a computational chip to convert the modulated frequency spectrum into a corresponding quantity count.

In one embodiment, there is attached to the sensor a communications component for receiving input from the sensor and transmitting the quantity count. The transmission can be accomplished via multiple ways, including but not limited to, an infrared signal to a handheld computer, a wireless communication to a nearby handheld computer via methods such as the Bluetooth standard, a long range wireless communication via a pager or Short Message System (SMS) or even a standard wired connection to a computing, display, or communication device.

In another embodiment, it is contemplated that the present invention can be used with a cabinet having multiple holding areas or pockets. Each holding area or pocket has an antenna that is coupled to the sensor via a multiplexer. The multiplexer enables the sensor to sequence through each holding area or pocket. The multiplexer selects a holding area or pocket, the sensor then sends a low intensity RF signal into the holding area or pocket, receives the modulated reflections from any tags encountered by the signal, converting the frequency spectrum of the reflected signals into a corresponding quantity count. A communication device connected to the sensor then transmits the inventory information. The multiplexer then selects the next antenna, and the process is then repeated. A communications device connected to the sensor enables the quantity and location of each count to be transmitted to a remote location.

The present invention also contemplates a method for calculating a quantity. A tag is placed on a group of items to be inventoried. The tag may be a conducting loop of material or a pattern of magnetic ink. A sensor with an antenna coupled to it sends an RF signal. Each tag creates a reflected signal upon receipt of the reflected signal. The antenna receives the reflected signal, which is then captured and sent to the sensor for interpretation. The sensor which also comprises computing component, interprets the received signal and correlates the frequency and/or amplitude peaks of the received signal to the number of tags required to cause the modulation of the received signal.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

This the drawings:

FIG. 1a is an front view of a cabinet with pockets for use with the present invention;

FIG. 1b is a side view of the cabinet shown in FIG. 1a;

FIG. 2 is a block diagram illustrating the component parts of the present invention;

FIG. 3 is a block diagram illustrating an alternative embodiment of the present invention;

FIG. 4 is a block diagram illustrating an alternative embodiment of the present invention wherein a separate antenna receives the reflected signal;

DETAILED DESCRIPTION OF INVENTION

Figure 5:
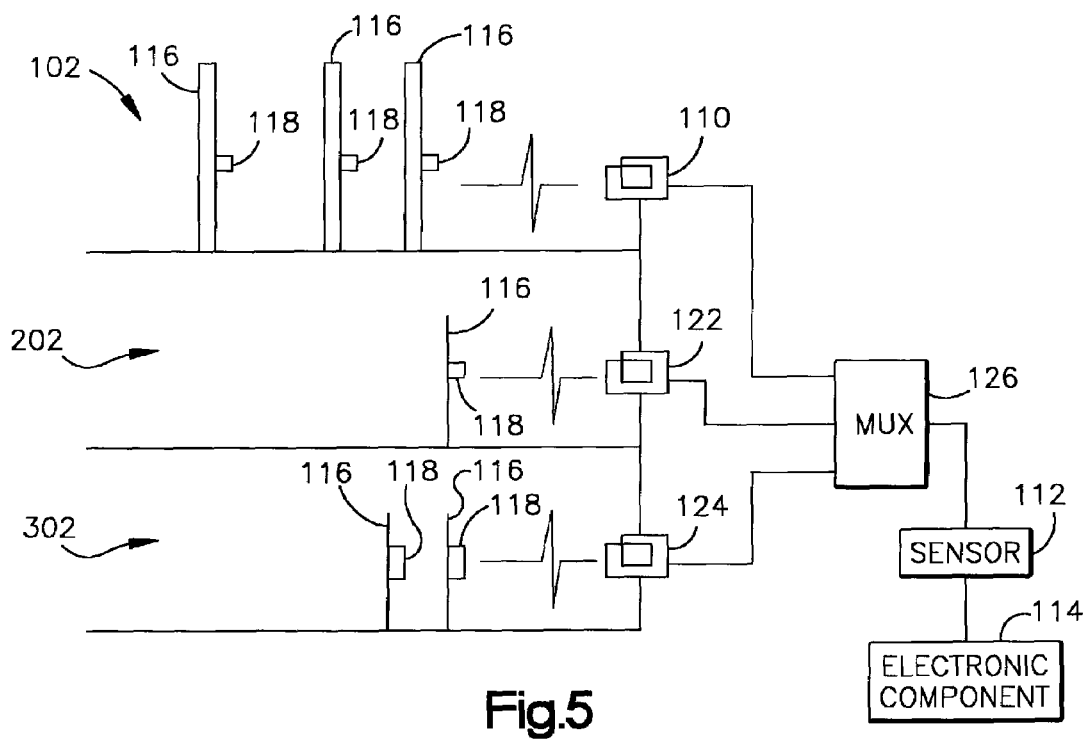
FIG. 5 is a block diagram of another embodiment of the present invention wherein a multiplexer is used to allow the sensor to select one of a plurality of holding areas.

The present invention will now be described in terms of the best mode and preferred embodiment. It is contemplated that the present invention will be used in conjunction with a cabinet or fixture used for retail sale. Normally, the cabinet will have several pockets where the retail pocket is located. The present invention will discover and communicate the status of each bin, pocket, or storage area of the cabinet or fixture without the need for a person to manually count the units. It is also contemplated that the present invention would allow for unattended monitoring of overall inventory by detecting and summing all products of all pockets or shelves of a cabinet.

Referring first to FIGS. 1a and 1b there is shown a typical cabinet 100 used for storing a retail product. The cabinet 100 is comprised of a frame 101 and a plurality of storage areas 102.

In FIG. 2 there is shown the components of a wherein the storage area 102 is a pocket or bin. Each pocket has a bottom 104, and at least two vertical walls 106 and 108. Mounted on a one of the horizontal walls, 106 in this case, is an antenna 110. The antenna is connected to a sensor 112 and the sensor 112 is connected to an electronic component 114. Inside the pocket 102, there is an item 116 to be inventoried. On the item is a tag 118. As shown in FIG. 2 the item 116 is substantially two dimensional, such as a card or an envelope. However, as shown in FIG. 3, the item 116 may have some thickness as well. It should also be noted that the tag 118 is not drawn to scale.

Preferably, the tag 118 would be a one bit tag. The tag 118 can be made of either a conducting loop of material, typically a true metallic hot stamp, or can be printed as a consistent pattern of magnetic ink on each item 118.

The sensor 112 and it antenna 110 is a device which sends out a low intensity RF signal and receives back the modulated reflection from any tag it encounters, or alternately detects the magnetic fields created by nearby magnetic tags 118. The antenna 110 is simply a metal loop of a size appropriate to the RF or magnetic fields being used by the sensor 112. The sensor 112 has circuits to detect the frequency response of the RF energy received. An algorithm built into a computational chip (not shown) converts the modulated frequency response to a corresponding quantity count. There are various methods available that the computational chip may utilize to determine the quantity count. For example, the chip may use a logarithmic based mathematical formula, Quantity=$K*\ln(x)$, where the variables K and x are dependent upon the antenna 110, the tag 118, and the item's 116 physical properties. Another method that may be utilized is to measure the response of known quantities and generate a lookup table (not shown) for the computational chip to use.

The electronic component 114 is attached to the sensor 112. The electronic component 114 is comprises communication equipment (not shown) for transmitting the quantity. The transmission can be accomplished via any of the usual communications methods that are well known, such as infrared, RF, Bluetooth standard, a pager, Short Message System (SMS) standard, or by standard wired connections. The transmission may be directed to a portable hand held device, computer, display or another communication device. Alternatively, the electronic component may be comprised of a data storage area which can be accessed either remotely or locally. By taking frequent counts, the system can determine when an item 116 has been removed and then subsequently returned, which often happens when a shopper is browsing. This could determine how often an item is browsed as opposed to purchased.

The embodiment shown in FIG. 3 shows is directed to a cabinet 100 that is comprised of shelf. In this embodiment, there is only one vertical wall 106, with the antenna 110 mounted therein. The item 116 is stored vertically. However, as those skilled in the art can readily appreciate, if it is desired to store the items horizontally, then the antenna 110 can be incorporated into the bottom surface 104, instead of the wall 106.

In FIG. 4 there is shown an embodiment wherein the sensor 112 uses a pair of antennas, 110 and 120. One antenna 110 transmits the RF signal, and the other antenna 120 receives the modulated or reflected signal.

In FIG. 5 there is shown an embodiment wherein a single sensor 112 can be used to monitor a plurality of storage areas 102, 202 and 302. Each storage area (102, 202 and 302) has its own antenna (110, 122, and 124) that is connected via a multiplexer 126 to the sensor 112. The sensor 112 then uses the multiplexer 126 to select a storage area, for example 102, and determine the inventory of that shelve. In this embodiment then, the sensor 112 would transmit the location or identity of the storage area to the electronic component 114 along with the quantity. The sensor 112 would then cycle to the next storage area, for example 202. The sensor 112 may be programmed to continuously cycle through the storage areas, 102, 202 and 302, or cycle through each storage area at a desired interval.

Figure 6:
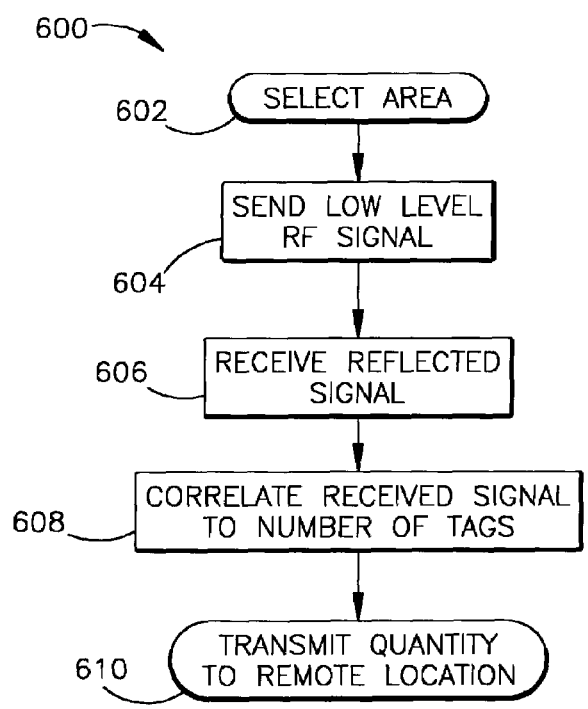
FIG. 6 is a block diagram illustrating the steps used by the method of the present invention.

Referring now to FIG. 6 there is shown a method 600 used by the present invention. The method will be explained by using the embodiment of FIG. 2, however it should be noted that the method is compatible with all of the embodiments. As shown in step 602, the sensor 112 selects a storage area 102. The sensor 112 at step 604 then sends a low level RF signal via its antenna 110. The signal goes out perpendicular to the face (wall) 106 and through the items 116, typically greeting cards or other flat/planer products) that are in the pocket. When the signal reaches a tag 118, the signal is modulated in a known way based on how many tags 118 are encountered. The signal at step 606 is received by the antenna 110 which captures the signal and sends it to the sensor 112 for interpretation. It should be noted that in FIG. 5, antenna 120 receives the signal. The sensor 112 then interprets the modulated signal to the number of tags encountered as shown in step 608.

As stated previously, there are various methods available that the computational chip may utilize to determine the quantity count. For example, the chip may use a logarithmic based mathematical formula, Quantity=$K*\ln(x)$, where the variables K and x are dependent upon the antenna 110, the tag 118, and the item's 116 physical properties. Another method that may be utilized is to measure the response of known quantities and generate a lookup table (not shown) for the computational chip to use.

At step 610 the sensor 112 transmits the identity of the storage area 102 and the quantity to the electronic component 114. The electronic component 114 either transmits the data to a remote location or stores the data. In the case of an embodiment with multiple storage areas such as shown in FIG. 5, the sensor 112 then switches via the multiplexer 126 (FIG. 5) to the next storage area, and the process repeats.

The entire process can be continuous to detect real time events, such as a person selecting a card from a pocket or replacing a card in a pocket. The process may also be initiated via external means such as pushing a start button or sending a remote signal to the sensor to start the process.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A method for calculating inventory, comprising:
   attaching a one bit tag to each of a plurality of items to be inventoried at a storage location;
   transmitting a signal that interacts with the tag of each item present at the storage location;
   receiving a one-bit frequency modulated signal resulting from the interaction between the signal and each of the one bit tags; and
   calculating the quantity of items present at the storage location by correlating the frequency modulated signal with a corresponding quantity count.

2. The method of claim 1, wherein the correlating step further comprises measuring a frequency of the modulated signal at a time when the amplitude of the modulated signal is maximized.

3. The method of claim 1 further comprising the step of transmitting the quantity to a remote location.

4. The method according to claim 1, wherein the step of attaching a one-bit tag comprises the step of:
   attaching a substantially identical one-bit tag to each of a plurality of different items stored at a plurality of separate storage locations.

5. The method according to claim 3, wherein the step of transmitting a signal comprises the steps of:
   selecting a desired storage location at which the inventory is to be calculated; and
   transmitting the signal to interact with the tag of each item present at the selected storage location with minimal interaction with tags adjacent to the storage location.

6. The method according to claim 5, further comprising the step of calculating quantity from plurality of separate storage of separate storage.

7. A system for monitoring a quantity of items stored at a storage location, the system comprising:
   a tag to be coupled to each item to be counted;
   a signal generator for generating an interrogation signal;
   an antenna dedicated to the storage location for transmitting the interrogation signal to interact with the tag coupled to each item present at the storage location;
   a receiver for receiving a secondary signal emitted in response to the frequency modulated interaction between the interrogation signal and the tags present at the storage location when the interrogation signal is transmitted; and
   a computing component comprising computer-readable instructions stored in a computer-readable memory for computing the quantity of items present at the storage location by correlating the frequency modulated secondary signal with a corresponding quantity count.

8. The system according to claim 7, wherein the tags to be coupled to the items at the storage location are substantially identical and are independent of the type of the items.

9. The system according to claim 7, wherein the interrogation signal is a radio-frequency signal that interacts with tags present at the storage location to which the antenna is dedicated and has a suitably-low intensity to minimize interaction of the interrogation signal with adjacent tags not present at the storage location.

10. The system according to claim 7, wherein the secondary signal is a reflected portion of the interrogation signal.

11. The system according to claim 7, wherein the computing component computes the quantity of items present at the storage location based on a modulated frequency spectrum of the secondary signal.

12. The system according to claim 7 further comprising a look-up table stored in the computer-readable memory to be used by the computing component for computing the quantity of items present at the storage location based on the received secondary signal.

13. The system according to claim 7, wherein the antenna dedicated to the storage location substantially continuously transmits the interrogation signal to compute the real-time quantity of items present at the storage location.

* * * * *